(No Model.)
H. M. WEAVER.
CASH CARRIER APPARATUS.
No. 513,547. Patented Jan. 30, 1894.
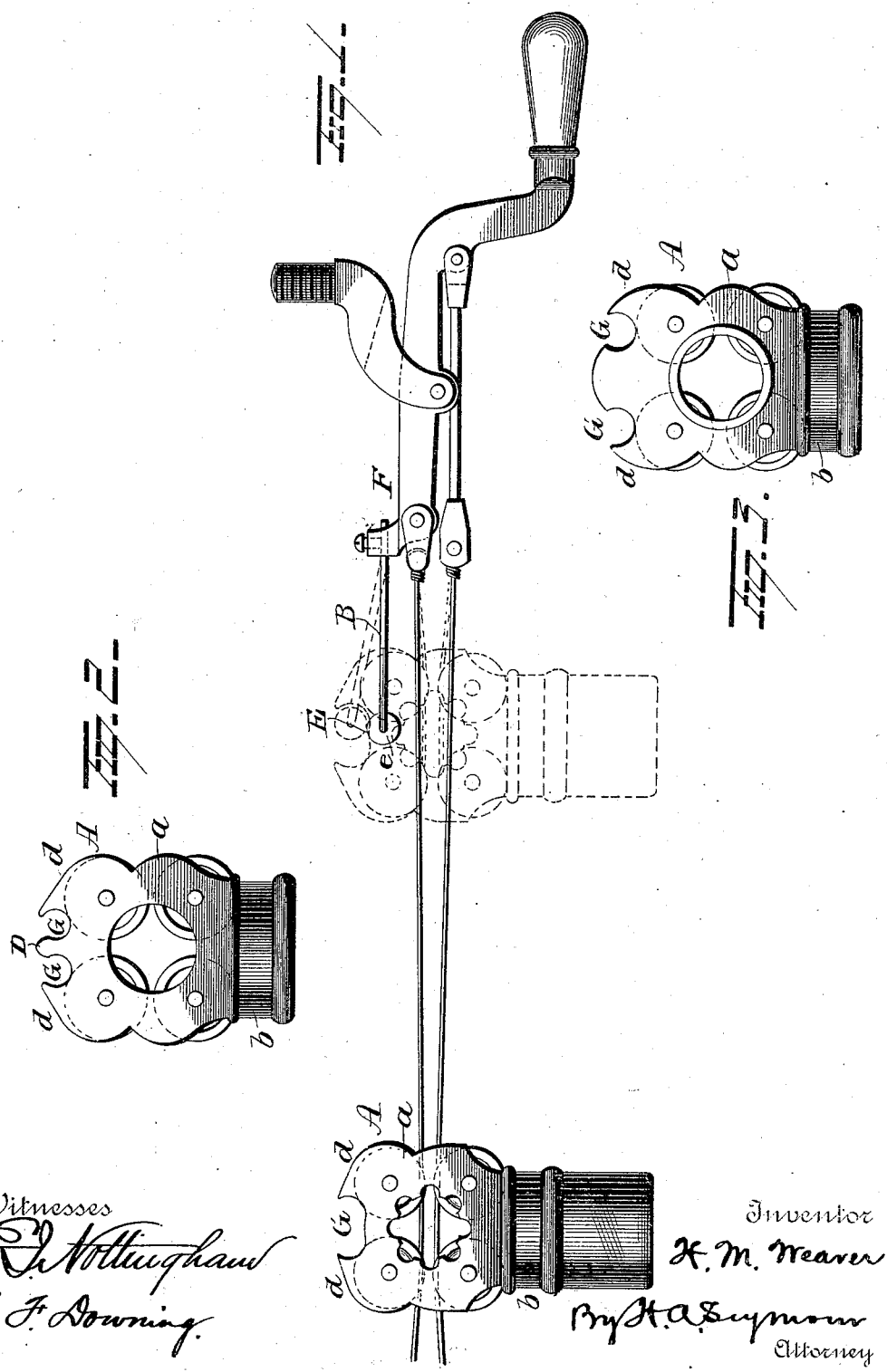
Witnesses
G. H. Nottingham
G. F. Downing
Inventor
H. M. Weaver
By H. A. Seymour
Attorney

UNITED STATES PATENT OFFICE.

HENRY M. WEAVER, OF MANSFIELD, OHIO.

CASH-CARRIER APPARATUS.

SPECIFICATION forming part of Letters Patent No. 513,547, dated January 30, 1894.

Application filed July 2, 1892. Serial No. 438,824. (No model.)

*To all whom it may concern:*

Be it known that I, HENRY M. WEAVER, of Mansfield, in the county of Richland and State of Ohio, have invented certain new and useful Improvements in Cash-Carrier Apparatus; and I do hereby declare the following to be a full, clear, and exact description of the invention, such as will enable others skilled in the art to which it appertains to make and use the same.

My invention relates to an improvement in cash carrier apparatus, the object being to provide means for stopping and holding the car or carrier when it reaches the end of the trackway, and for automatically releasing the car when the devices for propelling the car are actuated.

With these ends in view my invention consists in certain novel features of construction and combinations of parts as will be more fully described and pointed out in the claims.

In the accompanying drawings, Figure 1 is a view in side elevation of a portion of a two wire system with the car thereon, and Figs. 2 and 3 are views of modifications.

While the improvements herein disclosed might be used with any of the cash carrier systems employing wheeled carriers, it is particularly adapted for use with the Barr two wire system in which a wheeled carrier is propelled by the spreading of the wires behind the carrier. In this system the two wires are connected at their ends to a lever, which when turned from a horizontal to a vertical position separates the wires and propels the car.

F represents the actuating lever pivoted to a bracket designed to be attached to a post or other support depending from the ceiling. To this rod is attached one end of each track or propelling wire on which the car A is mounted and on which it travels. This carrier is composed of a pair of parallel plates $a, a$, and the usual cup holder $b$ adapted to support the cash cup. Between the plates $a, a$, several circumferentially grooved wheels, preferably four are journaled. These wheels are arranged in pairs, when four are employed, one pair above the other, one pair being above and in contact with one wire, and the other below and in contact with the other wire. Notch or recess G is formed in the upper edge of the plates $a$ and the edges $d, d,$ of the plates, leading to the notch or recess are inclined or curved so as to permit the car to pass partly under the combined catch and buffer B, the lower edges of the inclines being below the normal plane of the catch so that the latter is moved upwardly by the car. The catch is made of stiff spring wire bent into shape to form a cross bar $e$ adapted to enter the notch in the car, the ends of the wire being secured to the upper end of the operating lever F. The cross bar $e$ is covered by a rubber sleeve which not only deadens the sound, but also acts as a buffer and absorbs part of the shock which would otherwise fall on the car and wires, when the carrier is brought to a sudden stop by the dropping of the cross bar into the notch. As the carrier moves cross bar $e$, the side members of the catch yield or bend and as soon as the notch is reached the tension is released and the cross bar falls into the notch, stops the carrier and holds it against movement. With the system shown, to release the car, the handle end of the lever F is pulled downwardly thus spreading the wires. This movement of the lever lifts the cross bar $e$ and by the time the wires have been spread sufficiently to start the carrier, the cross bar $e$ has been elevated above the sides of the carrier thus leaving the latter free to start toward the opposite end of the line. When the device is employed with other systems, other means would be employed for elevating the catch. The notch G may be located centrally in the upper edge of the plates, or if preferred the notch may have a central partition D as shown in Fig. 2, or as shown in Fig. 3, the notches may be located near each end of the carrier.

Having fully described my invention, what I claim as new, and desire to secure by Letters Patent, is—

1. The combination of a carrier having a recess formed in its top, a spring catch, and a buffer consisting of a yielding covering on said catch which is adapted to enter the recess in the top of the carrier and lock the car against movement in either direction, substantially as set forth.

2. The combination with a carrier having its top rounded at its opposite ends and provided with a notch or recess between said rounded ends, of a spring catch provided with a buffer, said buffer being adapted to engage the rounded end at the top of the carrier and check its movement and to engage in said recess and lock the car against movement in either direction.

3. The combination of a carrier having a recessed or notched top as described, a spring catch and a buffer consisting of a yielding covering on said catch, the said buffer adapted to enter the recess or notch in the carrier and lock the latter against movement in either direction, substantially as set forth.

4. The combination with a pivoted lever and track wires connected to said lever on opposite sides of its axis, of a carrier having a recessed or notched top as described, a spring catch rigidly secured to said pivoted lever and moved thereby, and a buffer consisting of a yielding covering on said catch adapted to enter the recess or notch in the carrier and lock the latter against movement in either direction, substantially as set forth.

In testimony whereof I have signed this specification in the presence of two subscribing witnesses.

HENRY M. WEAVER.

Witnesses:
W. McE. WELDON,
NAT P. BIGELOW.